Dec. 30, 1969
J. VAN POOL
3,486,860
SULFUR PRODUCTION
Filed April 14, 1967
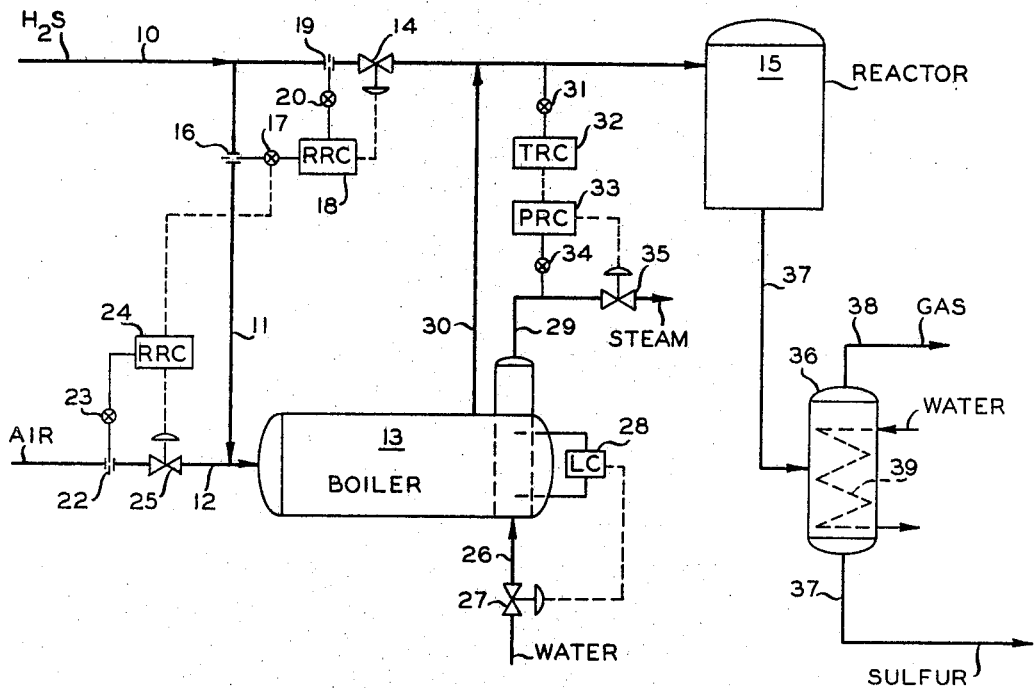
INVENTOR.
JOE VAN POOL
BY *Young & Quigg*
ATTORNEYS

3,486,860
SULFUR PRODUCTION

Joe Van Pool, Bartlesville, Okla., assignor to Phillips Petroleum Company, a corporation of Delaware
Filed Apr. 14, 1967, Ser. No. 631,019
Int. Cl. C01b *17/06*
U.S. Cl. 23—225      5 Claims

ABSTRACT OF THE DISCLOSURE

Sulfur is produced from a hydrogen sulfide-containing stream by passing approximately one-third of this hydrogen sulfide stream through a furnace wherein the hydrogen sulfide therein is reacted with oxygen to form a sulfur dioxide containing stream. The sulfur dioxide containing stream is then combined with the residual hydrogen sulfide stream (approximately two-thirds of the original hydrogen sulfide stream) to form a feed stream which is passed to a catalytic reactor. The temperature of this feed stream is maintained at an optimum sulfur conversion temperature by controlling the temperature of the sulfur dioxide containing stream independently of the flow of the hydrogen sulfide and oxygen feed streams.

---

This invention relates to the production of sulfur. In another aspect, this invention relates to a novel method of and apparatus for producing sulfur from hydrogen sulfide.

It is common practice to produce free sulfur from hydrogen sulfide by burning a portion of the hydrogen sulfide to form $SO_2$ in accordance with the equation:

$$2H_2S + 3O_2 = 2H_2O + 2SO_2$$

and then reacting the $SO_2$ with hydrogen sulfide in accordance with the equation:

$$2H_2S + SO_2 = 2H_2O + 3S$$

Conventionally, one-third of the hydrogen sulfide-containing stream is passed through a combustion chamber wherein the hydrogen sulfide is burned to form sulfur dioxide. The sulfur dioxide is then passed to the residual hydrogen sulfide stream (two-thirds of the original stream) to form a feed stream which is passed to a catalytic reactor wherein the sulfur dioxide and hydrogen sulfide react to form free sulfur. It has been known to attempt to maintain the temperature of the $SO_2$—$H_2S$ feed stream to the catalytic reactor at a substantially constant temperature by manipulating the supply of air to burn the hydrogen sulfide to sulfur dioxide. However, in such a control system, manipulating the air supply resulted in varying the ratio of hydrogen sulfide to sulfur dioxide in the catalytic reactor feed from the desired ratio of 2:1, thus reducing the efficiency of the process. Various other control methods have been developed for this process whereby the temperature control of the $SO_2$—$H_2S$ stream is "overridden" by the flow control of the $H_2S$ streams and the air stream, but these methods result in the temperature of the $SO_2$—$H_2S$ feed stream varying from the optimum a substantial portion of the operating time.

Thus, there is needed a control system for the above sulfur production process whereby the ratios of the two $H_2S$ streams and the air stream are controlled independently of the temperature of the $SO_2$—$H_2S$ stream to the catalytic reactor.

Accordingly, one object of the invention is to provide an improved method and apparatus for the production of sulfur.

Another object of this invention is to provide an improved and more efficient control system for producing sulfur from hydrogen sulfide.

According to one embodiment of this invention, an improved method of producing sulfur from hydrogen sulfide is provided comprising splitting a hydrogen sulfide-containing stream into two parts, the first part being approximately one-half the second part; passing the second part to a combustion zone wherein it is contacted with oxygen to form an $SO_2$-containing stream. The $SO_2$ stream is then passed to the said first portion to form an $SO_2$—$H_2S$ feed stream which is passed to a catalytic reactor. The temperature of this $SO_2$—$H_2S$ feed stream is maintained at the desired value by manipulating the temperature of the $SO_2$ containing stream independent from the ratio controls on the process feeds.

In a preferred embodiment of this invention, the temperature of the $SO_2$-containing stream is manipulated by passing a vaporizable fluid, such as water, in an indirect heat exchange relationship with the gases from said combustion zone and controlling the rate of withdrawal of said fluid from said heat exchange relationship. This fluid is generally withdrawn in the form of a vapor such as steam, the pressure of said vapor being manipulated to obtain a desired temperature of the $SO_2$—$H_2S$ feed stream. Thus, as the temperature of the $SO_2$—$H_2S$ feed stream drops below the optimum catalytic reaction temperature, the pressure of the vapor within the heat exchange zone will be increased, thereby causing the gases leaving the heat exchange zone to increase in temperature. This, in effect, will diminish the rate of heat removal from the combusted gases in a direct relationship to the increasing pressure of the stream because the average $\Delta t$ (driving force) is decreased in the heat exchanger.

According to another embodiment of this invention, an improved apparatus for producing sulfur from hydrogen sulfide is provided.

This invention can be more easily understood from a study of the drawing which is a schematic illustration of the preferred embodiment of this invention.

Now, referring to the drawing, the first portion of hydrogen sulfide containing gas is passed from any suitable source 10 through conduit 11 to conduit 12 and then to boiler 13. A second portion of hydrogen sulfide is passed from conduit 10 through valve 14 to reactor 15. A suitable oxygen-containing gas, such as air, is passed through conduit 12, admixed with the first portion of hydrogen sulfide therein, and then to boiler 13. A first signal representative of the pressure drop across orifice 16 is transmitted by transmitter 17 to a first input of ratio recorder controller 18. A second signal representative of the pressure drop across orifice 19 is transmitted by transmitter 20 to a second input of ratio recorder controller 18. Ratio recorder controller 18 determines the ratio of the first signal to the second signal and compares this ratio to a set point representative of the desired ratio. Valve 14 is adjusted responsive to the output of ratio recorder controller 18, thereby maintaining the ratio of the hydrogen sulfide flowing through valve 14 and the hydrogen sulfide flowing through conduit 11 at substantially 2 to 1.

It is noted that valve 14 is positioned within conduit 10 rather than conduit 11 because of the greater pressure drop of the stream passing through boiler 13. However, if a constriction is placed in conduit 10 downstream of conduit 11, to make the pressure drop therethrough equal to a greater than the preessure drop through boiler 13, then control valve 14 can be placed in conduit 11.

A third signal representative of the flow of air through orifice 22 is transmitted by transmitter 23 to a first input of ratio recorder controller 24. The said first signal is transmitted by transmitter 17 to a second input of ratio recorder controller 24. Then ratio recorder controller 24 determines the ratio of the third signal to the first signal and compares this ratio to a set point representative of the desired ratio in a similar manner as ratio recorder controller 18. Valve 25 is then adjusted responsive to the output of ratio recorder controller 24 to thereby maintain the ratio of oxygen in line 12 to $H_2S$ in line 11 substantially constant. This ratio can be selected to provide the amount of oxygen required to react with all of the hydrogen sulfide in line 11 to form sulfur dioxide. For example, when the gas flowing through conduit 11 is substantially pure hydrogen sulfide, then the desired ratio is 7.5 moles of air per mole of hydrogen sulfide. However, when the $H_2S$ containing-gas in conduit 11 is from a process, such as natural gasoline recovery, it can contain inert gases and/or combustible gases other than hydrogen sulfide. In cases where such combustible gases are present, the ratio of air in conduit 12 to gas in conduit 11 can be selected to provide sufficient oxygen for the combustion of the combustible gases passing into boiler 13 as well as for the hydrogen sulfide to be converted to sulfur dioxide. It is also understood that oxygen containing gases other than air can be utilized in this process.

Water is introduced into an enclosed chamber in boiler 13 through line 26, the rate thereof being controlled by valve 27 in response to liquid level controller 28. The water within boiler 13 comes into indirect heat exchange relationship with the hot combustion gases therein. This results in the formation of steam which is withdrawn from boiler 13 via conduit 29. It is readily seen that the removal of this steam results in the cooling of the hot combustion gases within boiler 13. The combustion products from boiler 13 normally comprise sulfur dioxide, hydrogen sulfide, water vapor, carbon dioxide, and nitrogen. These combustion products are passed to conduit 10 via conduit 30. Thus, the mixing of these combustion gases with the hydrogen sulfide containing gas flowing through conduit 10 results in the desired $SO_2$—$H_2S$ feed stream for catalytic reactor 15.

The admixing of these hot combustion gases with the $H_2S$ containing stream will warm the resulting stream to the optimum catalytic temperature which is from 450 to 475° F., preferably about 450° F. The temperature of the $SO_2$—$H_2S$ feed stream is sensed by temperature measuring and transmitting means 31, the latter transmitting a signal to temperature recorder controller 32. Temperature recorder controller 32 transmits a signal to pressure recoder controller 32 manipulating the set point thereof. The pressure of the steam within conduit 29 is sensed and transmitted by pressure sensing and transmitting means 34 and passed to the input of pressure recorder controller 33. Thus, this pressure input will be compared to the set point input received from temperature recorder controller 32, and pressure recorder controller 33 will in turn manipulate the flow rate control valve 35 accordingly, so that the temperature of the $SO_2$—$H_2S$ feed stream can be adjusted and controlled at substantially a constant, desired value by controlling the pressure of the cooling stream within conduit 29 and the heat exchanger in boiler 13. The $SO_2$—$H_2S$ feed stream is then passed to reactor 15 wherein the $SO_2$ is reacted with the $H_2S$ to form sulfur. Reactor 15 can contain any suitable catalyst known in the art such as bauxite. The hot effluent from reactor 15 is passed to separator cooler 36 via line 37. Separator cooler 36 is cooled by water flowing through coils 39 disposed in the interior thereof. Molten sulfur is removed via line 37 and effluent gases are removed via line 38. These gases can either be directed to a secondary catalytic reactor similar to reactor 15 or to a furnace wherein they are flared.

Thus, from the above description, it is readily seen that by the use of this invention, the ratio of the $H_2S$ going to the boiler and the $H_2S$ going to the reactor and the ratio of the oxygen-containing gas to the $H_2S$ going to the boiler can be controlled independently of the temperature of the resultant $SO_2H_2S$ feed stream. This results in a very accurate control of the sulfur conversion reaction.

As stated, the optimum temperature for the $SO_2$—$H_2S$ feed stream will be in the range from 450 to 475° F. This optimum tempearture will vary depending on the activity of the catalyst in the reactor and the other factors. The optimum temperature for the feed gas to reactor 15 can be determined by varying the temperature of the $SO_2$-containing stream from conduit 30 until a maximum temperatures increase in reactor 15 is obtained. The greater this increase in temperature, the greater the amount of sulfur formed. However, as stated, the initial temperature must be maintained at the optimum because if temperature of the feed is either too high or too low, the amount of sulfur formed in reactor 15 will decrease.

It must be noted that other methods of controlling the temperature of $SO_2$-containing stream can be used with this invention. For example, valve 35 and pressure sensing and transmitting means 34 can be removed from conduit 29 and operatively connected as control means to a heating device associated with the stream flowing in conduit 30. When done in this manner, it is readily seen that the temperature of the $SO_2$-containing stream in conduit 30 can be controlled by the heating device which in turn is controlled to achieve a desired temperature of the stream flowing in conduit 10.

The ratio controllers, pressure controller, temperature controller and the various flow, temperature and pressure sensing elements utilized in this invention can be any suitable type sensing and control devices known in the art.

The following example is presented to further illustrate the invention, but is not to be construed in limitation thereof.

EXAMPLE

A gas having a composition of approximately 67% $H_2S$, 25 percent $CO_2$, 6 percent water and 2 percent hydrocarbons, at a temperature of 120° F., and a pressure of 8 p.s.i.g. is passed into conduit 10 at a rate of 1,692,000 s.c.f.d. (at 60° F. and 14.4 p.s.i.a.), with a first portion thereof being passed through conduit 11 to conduit 12 at a rate of 564,000 s.c.f.d. while a second portion thereof is bypassed through valve 14 at a rate of 1,128,000 s.c.f.d. Air is passed through conduit 12 at rate of 2,965,000 s.c.f.d. Water is passed into boiler 13 via conduit 26 at a rate of about 25,900 gallons per day. This results in about 215,000 pounds per day of steam passing through conduit 29. The combustion products comprising sulfur dioxide, carbon dioxide, and water are removed through line 30 at a temperature of approximately 577° F. and passed into conduit 10 wherein they are admixed with the second portion of hydrogen sulfide. The action of temperature controller 32, pressure controller 33 and valve 35 will control the generated steam pressure within boiler 13 at a value normally between 140 p.s.i.g. and 160 p.s.i.g. as the temperature of the mixed $SO_2$—$H_2S$ feed stream varies from 440° F. to 480° F. which in turn will control the temperature of the combustion products in conduit 30 at a value between 540° F. and 600° F., respectively.

As illustrated, the temperature of the $SO_2$—$H_2S$ feed stream can be maintained at 450±5° F. It is noted that this is done independently of the $H_2S/SO_2$ and $H_2S$/air ratios. The temperature rise across catalytic reactor 15 which is filled with a bauxite catalyst is approximately 300° F. and the effluent withdrawn therefrom is at about 750° F. Water is passed through coil 37 around tubes (gas through tubes) in separator 36 to produce about 45 p.s.i.g. steam. Eightly-eight weight percent of the sulfur is recovered from the reactor products and withdrawn through conduit 37. This is an increase of about 3 weight percent over conventional methods. The resulting combustion gases comprising $CO_2$, $H_2S$, $SO_2$, water, and nitrogen are passed to a stack via conduit 38.

The various modifications and alternations of this invention will become apparent to those skilled in the art without departing from the scope or spirit of this invention, and it should be understood that the foregoing discussion should not be construed to limit unduly this subject invention.

I claim:
1. In a process for the production of sulfur by
(a) dividing an $H_2S$ containing stream into first and second streams;
(b) passing said second stream to a combustion zone;
(c) passing an oxygen containing stream to said combustion zone to react with substantially all of the $H_2S$ in said second stream to form an $SO_2$ containing stream;
(d) passing said $SO_2$ containing stream from said combustion zone and combining it with said first stream to form a combined feed stream;
(e) passing said combined feed stream to a reaction zone and therein reacting $H_2S$ with $SO_2$ to form sulfur; and
(f) recovering the sulfur from said reaction zone; the improvement which comprises;
(g) automatically maintaining the rate of flow of said second stream substantially equal to one-third of the rate of flow of said $H_2S$ containing stream;
(h) continuously measuring the rate of flow of said second stream and continuously adjusting the rate of flow said oxygen containing stream in response thereto so as to maintain a predetermined ratio between the flow rates of said second stream and said oxygen containing stream;
(i) continuously measuring the temperature of said combined feed stream and comparing the sensed temperature with a predetermined desired temperature; and
(j) continuously manipulating the temperature of said $SO_2$ containing stream responsive to the comparison of said measured temperature with said predetermined temperature so as to maintain said measured temperature equal to said desired temperature.

2. The process of claim 1 wherein the temperature of said $SO_2$ containing stream is manipulated by passing a stream of a vaporizable fluid in indirect heat exchange relationship with said $SO_2$ containing stream to cause at least a portion of said fluid to vaporize, and continuously controlling the pressure of said fluid from said indirect heat exchange relationship in response to the measured temperature of said combined feed stream to thereby cause a corresponding temperature variation of said $SO_2$ containing stream from said combustion zone.

3. The method of claim 2 wherein said vaporizable fluid is water.

4. The method of claim 1 wherein the ratio of the rate of flow of said first stream to the rate of flow of said second stream is controlled by continuously measuring the flow rates of said first and second streams, continuously comparing the ratio of said flow rates with a first predetermined desired ratio and controlling the flow of one of said streams to maintain said measured ratio equal to said first predetermined desired ratio.

5. The method of claim 1 wherein the amount of said oxygen containing gas passed to said combustion zone is controlled by continuously measuring the flow rate of said oxygen containing gas and the flow rate of said second stream, continuously comparing the ratio of the flow rates of said oxygen containing gas and said second stream to a predetermined desired ratio, and continuously controlling the flow rate of said oxygen containing gas to maintain the ratio of the flow rates of said oxygen containing gas and said second stream equal to said predetermined desired ratio.

References Cited

UNITED STATES PATENTS

| 2,650,154 | 8/1953 | Anderson | 23—225 |
| 2,708,983 | 5/1955 | McCarthy | 23—225 |
| 3,219,415 | 11/1965 | Hensley | 23—225 |

OTHER REFERENCES

Perry, J. H.: Chemical Engineer's Handbook, 3rd edition, McGraw-Hill, New York, 1950, p. 1334.

OSCAR R. VERTIZ, Primary Examiner

G. O. PETERS, Assistant Examiner

U.S. Cl. X.R.

23—224, 262